United States Patent [19]

Matiere

[11] Patent Number: 4,835,936
[45] Date of Patent: Jun. 6, 1989

[54] PROCESS FOR OBTAINING HOLLOW STRUCTURES SUCH AS CONDUITS, SILOS OR SHELTERS

[76] Inventor: Marcel Matiere, 17 Avenue Aristide Briand, 15000 Aurillac, France

[21] Appl. No.: 700,885
[22] PCT Filed: May 16, 1984
[86] PCT No.: PCT/FR84/00132
 § 371 Date: Apr. 24, 1987
 § 102(e) Date: Apr. 24, 1987
[87] PCT Pub. No.: WO84/04753
 PCT Pub. Date: Nov. 22, 1984

[30] Foreign Application Priority Data

May 17, 1983 [FR] France .................. 83 08167
Jun. 20, 1983 [FR] France .................. 83 10181
Feb. 8, 1984 [FR] France .................. 84 01957

[51] Int. Cl.$^4$ ................................ E04B 1/00
[52] U.S. Cl. ............................ 52/741; 52/227
[58] Field of Search ........... 52/227, 741; 405/146, 405/134; 114/65 A, 77 R

[56] References Cited
U.S. PATENT DOCUMENTS

| | | | |
|---|---|---|---|
| 1,324,744 | 12/1919 | Macdonald et al. | 114/65 A |
| 2,341,008 | 2/1944 | Yourkevitch | 114/65 A |
| 2,344,223 | 3/1944 | Upson et al. | 52/227 X |
| 2,691,291 | 10/1954 | Henderson | 52/227 X |
| 4,159,602 | 7/1979 | Polack | 52/227 X |
| 4,622,788 | 11/1986 | Paulsson et al. | 52/227 X |
| 4,644,978 | 2/1987 | Bonasso | 52/227 X |

FOREIGN PATENT DOCUMENTS 1191640 4/1965 Fed. Rep. of Germany .
580289 11/1924 France .
1597170 7/1970 France .

OTHER PUBLICATIONS

"Spannbeton für die Praxis", 2nd issue, Berlin, 1962, pp. 530-533, Wilhelm Ernst & Sohn.

Primary Examiner—Carl D. Friedman
Attorney, Agent, or Firm—Frost & Jacobs

[57] ABSTRACT

A process for obtaining hollow structures by assembling a plurality of prefabricated, longitudinal elements each corresponding to a portion of the cross-section of the structure on supports intended to prevent friction between the ground and the base of the structure, the structure being subjected to a prestressing operation in which the elements of the structure are displaced relative to the supports on which they are assembled.

5 Claims, 2 Drawing Sheets

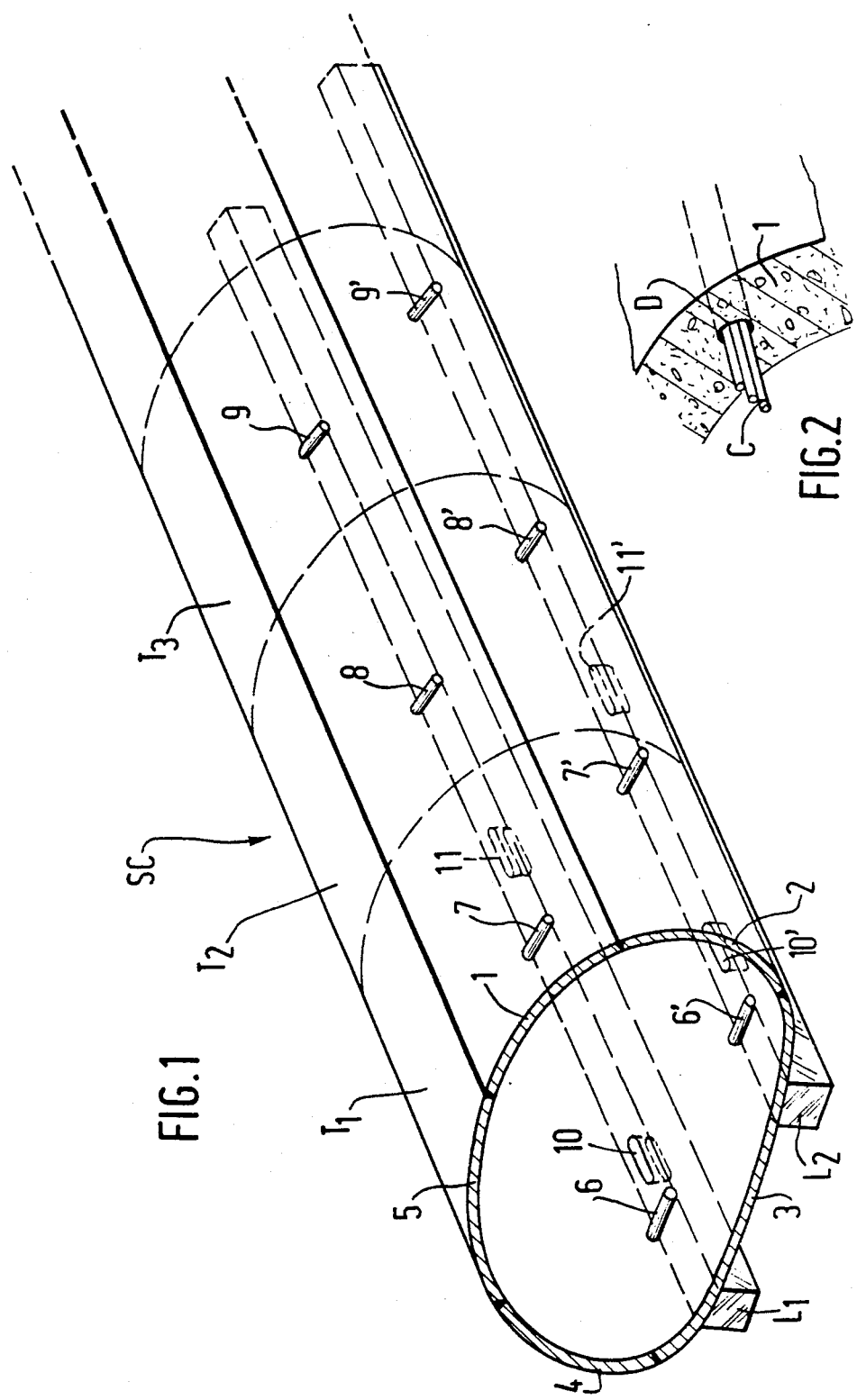

PROCESS FOR OBTAINING HOLLOW STRUCTURES SUCH AS CONDUITS, SILOS OR SHELTERS

The present invention relates to a new means of carrying out the process for obtaining hollow structures, such as conduits, silos or shelters, and to such hollow structures.

To improve the structural rigidity of such a hollow structure once it has been assembled on site, it is judicious to subject it to poststress, i.e., stressing following assembly, in order to secure the various shells constituting the structure to one another more closely, improve the leak-proofing of the assembly and make it possible to do without abutments at the location of the bends.

SUMMARY OF THE INVENTION

The process according to the invention is defined in that, when a certain length of hollow structure comprised of several longitudinal sections placed end to end is assembled, these sections are arranged on longitudinal supports intended for preventing the friction of the ground from acting against the base of the structure, when the structure is subjected to a prestressing operation by means of cables or rods arranged longitudinally, with relative displacement of the sections of the hollow structure relative to the supports.

According to other particular features of the invention:

(a) The longitudinal supports consists of ballasting or anchoring blocks or of longitudinal laying beams, (b) After the length of hollow structure has been subjected to stress, the longitudinal supports are fastened positively to the base of the structure, in particular as the result of the screwing of threaded members from the interior of the structured, (c) Moveable members are provided between longitudinal supports and the sections of the structure, (d) The moveable members may consist of any suitable material or shape, such as round iron concrete reinforcing bars, greased metal members or plastic sliding sheets.

On the other hand, in some large-size conduits, where the ground is particularly unstable, it has become apparent that the joints between adjacent elements do not make it possible to give the structure sufficient flexibility in the transverse direction.

It was found that it was possible to increase this transverse flexibility by the use of prefabricated elements which have, in cross-section, at least one thinned portion oriented parallel to the axis of the hollow structure which gives them flexibility.

These elements can be made of concrete constructed with reinforcing iron bars grouped in at least one continuous layer in cross-section from one edge of the element to the other, a single continuous layer in cross-section is provided, this layer located approximately at the center of each thinned portion. The unthinned portions may or may not incorporate other reinforcing iron bars.

It will be seen that such elements have a certain flexibility in the transverse direction, but that their rigidity in the longitudinal direction is practically unaffected.

DESCRIPTION OF THE DRAWINGS

Other characteristics and advantages of the invention will be revealed in the rest of the description given by the way of non-limiting example, with reference to the attached drawings in which:

FIG. 1 is a perspective view showing a length of the hollow structure which is placed on supports;

FIG. 2 is an enlarged partial view of FIG. 1:

DESCRIPTION OF THE PREFERRED EMBODIMENTS

Figure 3:
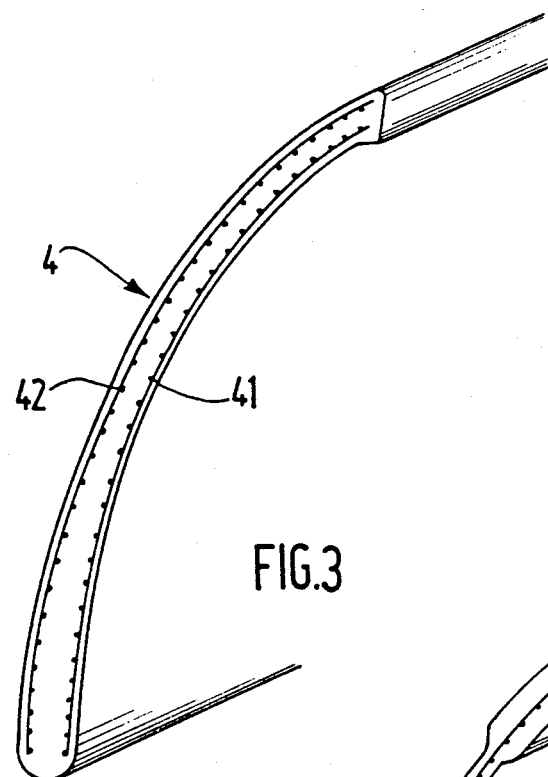
FIG. 3 is a sectional and perspective view of a prefabricated concrete element of conventional type.

FIG. 1 illustrates, in a perspective view, a hollow structure of large cross-section, which is designated as a whole by SC, and which is composed of a plurality of sections, such as T1, T2, T3, themselves formed from several prefabricated elements designated by 1, 2, 3, 4, 5 for the element T1.

To improve the rigidity and cohesion of the hollow structure and of its component sections, the following procedure according to the invention is adopted: After a certain length of hollow structure, comprised of several longitudinal sections T1, T2, T3 etc. placed end to end, has been assembled, this length of structure is subjected to prestress by means of cables C placed in channels D arranged longitudinally in the thickness of the elements, as indicated in FIG. 2. It should be noted that this stressing of the structure is considered as a prestress before it is put into operation and as a poststress after it has been installed. However, if the sections were installed directly on the ground, they could not be displaced relative to one another because of the friction exerted by the ground.

Consequently, to prevent the tension of the cables from being rendered ineffective by the friction of the ground, longitudinal supports are arranged under the hollow structure beforehand, as indicated at L1 and L2 in the Figure. These longitudinal supports can consist of ballasting or anchoring blocks or longitudinal beams.

However, according to another characteristic of the invention, to reduce even further the friction exerted between the base of the hollow structure and the longitudinal supports, sliding or rolling members are arranged between the base and the supports, as indicated at 6, 6'; 7, 7'; 8, 8'; 9, 9'. For example, simple round iron concrete reinforcing bars can be used as rolling members. It is also possible to insert greased metal members or plastic sheets.

The prestressing cables can also be arranged longitudinally on the outside of the hollow structure, preferably outside the ballasting or anchoring blocks and the actual structure itself. It should be noted, moreover, that the ballasting or anchoring blocks can be replaced by longitudinal laying beams.

After the length of structure has been subjected to prestress, the ballasting or anchoring blocks or the longitudinal beams can be fastened positively to the base of the structure and/or in the ground, particularly by means of threaded members which are screwed from the interior of the structure. For this purpose, in the exemplary embodiments there are holes 10, 11, 10', 11' for the passage of the threaded members through the structure, these holes being oblong so as to match the relative displacement of the sections T1, T2, T3, etc., when they are subjected to stress.

In all the foregoing, the description relates to longitudinal sections, placed end to end and subjected to prestress by means of cables or rods arranged longitudinally, are assembled. The invention can also be used when large-size structures, formed from several individual elements to form one cross-section, are subjected to prestress by means of cables or rods arranged in a transverse plane. In this case, the elements forming the lower portion of the structure have horizontal supporting surfaces carried, for example, by projecting shoulders and resting on supports intended for preventing or reducing friction on the ground.

The iron concrete bars, if used, are then arranged with their axis directed longitudinally.

If greased metal members or plastic sheets are used, they can serve to make it easier to put the structure under prestress both in one direction and in the other.

FIG. 3 shows a prefabricated element 4 made of reinforced concrete and prepared according to the standard technique, that is to say with two layers of reinforcing iron bars 41, 42 located respectively in the vicintiy of the inner surface and the outer surface of the element. It will be noted, moreover, that the longitudinal edges of the element are flattened or rounded, to make it possible to provide a junction allowing certain pivoting in the manner of a joint with the bed plate and/or the adjacent elements.

Figure 4:
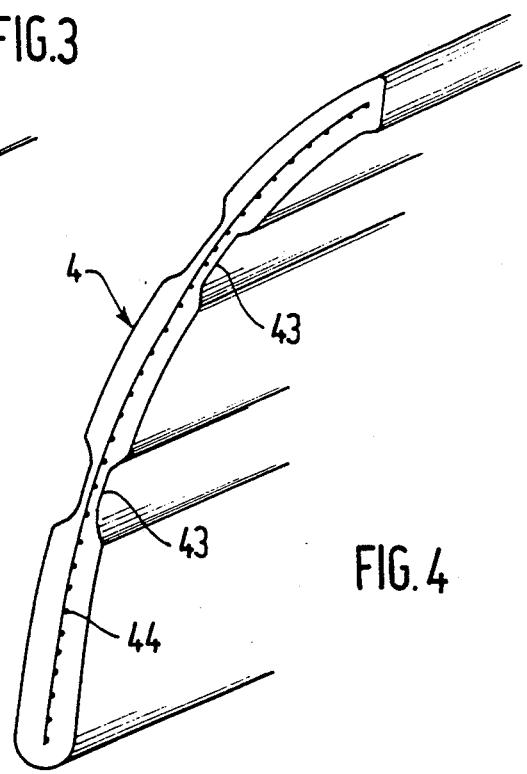
FIG. 4 is a similar view of a prefabricated element according to the invention.

FIG. 4 shows element 4 modified according to the invention possessing thinned portions 43 which give it flexibility. The reinforcing iron bars 44 are grouped in a single layer which extends approximately at the center of each thinned portion. The unthinned portions can, if appropriate, incorporate other reinforcing iron bars.

The invention can of course be used when the elements are made of materials other than reinforced concrete.

FIG. 1 shows a structure, of which the lower element 3 of the section T1 consists of an element prefabricated in one piece. According to another embodiment, the lower element comprises two prefabricated pieces in the form of a gutter, and on these are mounted lateral elements, the lower edge of which positions itself in the gutter, thus making an articulated connection. Cross members which can likewise be prefabricated elements retain the gutter-shaped pieces, at the same time ensuring their strict positioning. It becomes easier to assemble the lateral elements because it is possible for these to pivot in the grooves.

The grooves and crossmembers are subsequently embedded in the concrete to constitute the bed plate, thus locking the articulated connections while at the same time ensuring leak-proofing.

According to another procedure of the invention, there are longitudinal beams L1, L2 which are each fixed to several longitudinal elements T1, T2, T3 end to end and which secure them to one another so as to prevent their relative movement. These longitudinal beams can extend over the entire length of the conduit or can have a length corresponding to 3 or 4 elements, in order to allow minor adjustments. Each interruption in the longitudinal beams corresponds to one element end. The left and right longitudinal beams can be interrupted at different locations. These longitudinal beams can be made of concrete and can be poured on the spot, after the installation of a length of conduit corresponding to several longitudinal elements end to end. If the elements are made of metal, the longitudinal beams are preferably of the same metal and are installed, for example, by being bolted together.

I claim:

1. A method for assembling an elongated hollow body composed of a plurality of hollow sections adapted to be juxtaposed end-to-end to form said hollow body, comprising the steps of:
    (a) providing a plurality of elongated supports arranged in parallel relation;
    (b) positioning a plurality of movable members on said supports;
    (c) seating a plurality of said sections of said movable members in end-to-end relationship to each other;
    (d) providing a series of cables extending lengthwise of said sections; and
    (e) prestressing said sections by drawing said sections into tight engagement with each other by means of said cables, said prestressing step being carried out with relative displacement of said sections in relation to said supports.

2. The method of claim 1 wherein the step of providing a plurality of elongated supports includes selecting said supports from the group consisting of ballasting blocks and anchoring blocks and longitudinal beams.

3. The method of claim 1 further including the step of fastening said sections to one another by positively fastening said body to said supports following prestressing, thereby preventing motion between said body and said supports.

4. The method of claim 1 wherein the step of providing a plurality of movable members includes selecting said members from the group consisting of round iron bars, greased metal members and plastic sheets.

5. The method of claim 1 further including the step of providing at least one thinned wall portion in each said hollow section thereby giving each said hollow section flexibility.